(12) United States Patent
Turner et al.

(10) Patent No.: US 9,629,390 B1
(45) Date of Patent: Apr. 25, 2017

(54) SORREL HARVESTING MACHINE WITH SPACED APART ROTATING RETURN AND CUTTING DRUMS MOVING IN OPPOSITE DIRECTIONS AT A THROAT THEREBETWEEN

(71) Applicants: Oral Oneal Turner, Watson Hill (JM); Allison Deborah Turner, Watson Hill (JM)

(72) Inventors: Oral Oneal Turner, Watson Hill (JM); Allison Deborah Turner, Watson Hill (JM)

(73) Assignee: TURNER INNOVATIONS LTD. (JM)

( * ) Notice: Subject to any disclaimer, the term of this patent is extended or adjusted under 35 U.S.C. 154(b) by 66 days.

(21) Appl. No.: 14/163,804

(22) Filed: Jan. 24, 2014

Related U.S. Application Data (60) Provisional application No. 61/757,098, filed on Jan. 26, 2013.

(51) Int. Cl.
*A23N 5/00* (2006.01)
*A23N 4/24* (2006.01)

(52) U.S. Cl.
CPC ..................... *A23N 4/24* (2013.01)

(58) Field of Classification Search
CPC . B02B 3/045; B02B 3/04; A01F 11/06; A01F 11/00; A23N 15/10; B02C 4/26; A01D 45/00; A01D 45/02; B07B 4/08
USPC ....... 99/574, 567, 568, 617; 241/227, 101.5, 241/190, 239, 285.3; 460/45, 46, 123, 460/131, 142, 132, 27, 35
See application file for complete search history.

(56) References Cited

U.S. PATENT DOCUMENTS

| | | | | |
|---|---|---|---|---|
| 262,051 | A * | 8/1882 | Kelley et al. | B02C 18/0007 241/167 |
| 801,593 | A * | 10/1905 | Ireland | A23N 5/00 241/243 |
| 807,551 | A * | 12/1905 | Gordon | A23N 5/00 99/575 |
| 1,494,036 | A * | 5/1924 | Straub | B02C 4/30 241/235 |
| 1,594,702 | A * | 8/1926 | Williams | A23N 5/08 209/688 |
| 1,704,427 | A * | 3/1929 | Coggins | A23N 15/10 460/131 |

(Continued)

FOREIGN PATENT DOCUMENTS

| | | | | |
|---|---|---|---|---|
| CN | 201398427 Y | * | 2/2010 | A23N 5/00 |
| CN | 202043466 U | * | 11/2011 | A01F 11/06 |

(Continued)

*Primary Examiner* — Árpád Fábián-Kovács
(74) *Attorney, Agent, or Firm* — Glenn E. Gold, P.A.; Glenn E. Gold

(57) ABSTRACT

A machine for removing the calyces from the seed of a sorrel bud includes a smooth surfaced return drum rotatably mounted to a frame and a cutting drum rotatable about a cutting drum axle and mounted to the frame in a tandem relationship with the return drum. The cutting drum has a plurality of circumferential blades oriented perpendicular to the cutting drum axle and are substantially equally spaced one from another. The cutting drum in combination with the return drum defines a throat therebetween for receiving sorrel buds. A drive simultaneously rotates the return drum and the cutting drum to cut calyces from the seed of the sorrel bud.

15 Claims, 9 Drawing Sheets

(56) References Cited

U.S. PATENT DOCUMENTS

| | | | | |
|---|---|---|---|---|
| 2,144,841 A * | 1/1939 | Glaser | A23N 5/01 | 241/230 |
| 2,338,308 A * | 1/1944 | Thompson | A01F 11/02 | 460/103 |
| 2,353,841 A * | 7/1944 | McKinnis | A23N 1/003 | 100/161 |
| 2,654,054 A * | 9/1953 | Morelock | G01N 27/048 | 324/695 |
| 2,723,669 A * | 11/1955 | Pool | C13B 5/02 | 460/135 |
| 2,736,275 A * | 2/1956 | Perky | A21C 5/00 | 241/101.5 |
| 3,104,692 A * | 9/1963 | Davis | B02B 3/045 | 241/232 |
| 3,348,780 A * | 10/1967 | Barkstrom | A01F 11/06 | 241/101.6 |
| 3,401,727 A * | 9/1968 | Blanshine | A01F 11/06 | 241/101.5 |
| 3,552,463 A * | 1/1971 | Witt | A01F 29/10 | 241/222 |
| 3,662,762 A * | 5/1972 | Brass | A01F 11/06 | 460/109 |
| 3,695,273 A * | 10/1972 | Taylor | A23N 15/10 | 460/116 |
| 3,789,715 A * | 2/1974 | Schuchardt | B26F 1/44 | 83/346 |
| 3,915,082 A * | 10/1975 | Rejsa | A23N 4/06 | 99/548 |
| 4,151,004 A * | 4/1979 | Vukelic | C13B 5/02 | 127/2 |
| 4,173,177 A * | 11/1979 | Davis | B02B 3/045 | 99/574 |
| 4,194,445 A * | 3/1980 | Gemsjager | B02B 3/045 | 100/168 |
| 4,239,140 A * | 12/1980 | Collins | B01J 2/22 | 225/4 |
| 4,347,260 A * | 8/1982 | Crompton | A23N 5/008 | 426/483 |
| 4,389,927 A * | 6/1983 | Crompton | A23N 5/00 | 209/673 |
| 4,453,288 A * | 6/1984 | Lobiondo | A22C 9/004 | 452/142 |
| 4,462,309 A * | 7/1984 | Frazier | A23N 5/00 | 99/575 |
| 4,608,007 A * | 8/1986 | Wood | B02C 4/32 | 100/907 |
| 4,777,872 A * | 10/1988 | Gutierrez Rubio | A23N 4/085 | 83/425.3 |
| 4,787,402 A * | 11/1988 | Leonard | A24B 5/16 | 131/353 |
| 4,796,680 A * | 1/1989 | Koba | B27D 1/005 | 100/121 |
| 5,129,435 A * | 7/1992 | Beuving | B27N 3/18 | 144/2.1 |
| 5,454,303 A * | 10/1995 | Spry | A01F 11/06 | 460/133 |
| 5,678,477 A * | 10/1997 | Satake | B02B 3/045 | 99/519 |
| 5,697,292 A * | 12/1997 | Simmons | A23N 5/00 | 99/574 |
| 5,697,560 A * | 12/1997 | Bennett | D01G 1/04 | 241/159 |
| 5,954,278 A * | 9/1999 | Bennett | C03B 37/16 | 241/186.35 |
| 6,892,617 B1 * | 5/2005 | Knauder | B29C 70/305 | 83/348 |
| 8,596,193 B2 * | 12/2013 | Sakamoto | B02B 3/045 | 99/581 |
| 2002/0100373 A1 * | 8/2002 | Granger | A23N 5/00 | 99/585 |
| 2004/0261635 A1 * | 12/2004 | Gorlitz | B02B 3/045 | 99/617 |
| 2007/0004480 A1 * | 1/2007 | Taylor | A23N 15/10 | 460/142 |
| 2013/0015276 A1 * | 1/2013 | Zehavi | B02C 4/02 | 241/24.1 |
| 2013/0133529 A1 * | 5/2013 | Roig Borrell | A23N 5/008 | 99/574 |
| 2014/0231559 A1 * | 8/2014 | Schie | B27L 11/002 | 241/37.5 |
| 2014/0245799 A1 * | 9/2014 | Kim | C05F 11/00 | 71/10 |
| 2015/0102148 A1 * | 4/2015 | Pallmann | B02C 4/283 | 241/227 |
| 2015/0260266 A1 * | 9/2015 | Bassinello | F16H 9/04 | 474/70 |

FOREIGN PATENT DOCUMENTS

| | | | | |
|---|---|---|---|---|
| CN | 202819551 U | * | 3/2013 | A23N 5/01 |
| CN | 203120924 U | * | 8/2013 | A23N 5/01 |
| CN | 203167978 U | * | 9/2013 | A23N 5/01 |
| CN | 203618729 U | * | 6/2014 | A23N 5/01 |
| CN | 104223324 A | * | 12/2014 | A23N 5/00 |
| CN | 203976756 U | * | 12/2014 | C11B 1/04 |
| CN | 104397837 A | * | 3/2015 | A23N 5/01 |
| DE | 1579452 B | * | 7/1970 | A22C 29/00 |
| JP | 08289717 A | * | 11/1996 | A22C 29/02 |
| WO | WO 2006002555 A1 | * | 1/2006 | B02B 1/02 |

* cited by examiner

SORREL HARVESTING MACHINE WITH SPACED APART ROTATING RETURN AND CUTTING DRUMS MOVING IN OPPOSITE DIRECTIONS AT A THROAT THEREBETWEEN

CROSS-REFERENCE TO RELATED APPLICATION

This Non-Provisional Utility application claims the benefit of U.S. Provisional Patent Application Ser. No. 61/757,098, filed on Jan. 26, 2013, which is incorporated herein in its entirety.

FIELD OF THE INVENTION

The present disclosure generally relates to apparatuses and methods for harvesting sorrel. More particularly, the present disclosure relates to an apparatus for separating the calyces from the seed of a sorrel bud.

BACKGROUND OF THE INVENTION

The Roselle *Hibiscus Sabdariffa*, more commonly known as sorrel, is a species of *Hibiscus* that is native to the tropics of the eastern hemisphere and is used for the production of bast fiber from the plant stem and the red calyces are used as an infusion for flavoring drinks. The plant is considered to have antihypertensive properties and has been used in folk medicine as a diuretic, mild laxative, and treatment for cardiac and nerve diseases and cancer. In addition to its well documented hypotensive effects, sorrel has one of the highest levels of antioxidants of any widely available food.

The fruit of the sorrel has red fleshy petals, called calyces, surrounding a large seed capsule in the center of the fruit. The red calyces of the plant are the primary object of the sorrel harvest and are increasingly exported to America and Europe. The present method of sorrel harvesting is largely a task of manual labor using a makeshift hand tool made from a tube having a serrated bottom and approximately the same diameter of the seed. The serrated end of the tube is used to cut through the base of the calyces and then push the seed capsule out of the fruit thereby leaving the calyces free.

This harvest methodology has two primary shortcomings. First, the labor cost is high since several laborers are required to pick the sorrel buds and remove the seeds from the calyces. Two laborers require approximately fifteen days to harvest one acre of sorrel. Secondly, as a result of the time period required for harvesting the preservation of the sorrel calyces is being compromised. The extensive time required for harvesting results in a significant delay before preservation and use, and thus the calyces start to break down and deteriorate. This is especially so when handling large quantities.

However, the current manual separation of the calyces petals from the seed capsules is a highly time consuming expenditure of manual labor. Therefore, an apparatus is needed to automate the separation process and reduce the time required to efficiently harvest the sorrel.

SUMMARY OF THE INVENTION

The present disclosure is generally directed to a sorrel harvesting machine for removing the calyces from the seed of a sorrel bud. The sorrel harvesting machine includes a frame and a return drum rotatably mounted thereto wherein the return drum has a substantially smooth face. A cutting drum is rotatable about a cutting drum axle and is mounted to the frame in a tandem relationship with the return drum. The cutting drum has a plurality of circumferential blades oriented perpendicular to the cutting drum axle wherein the circumferential blades are substantially equally spaced one from another. The cutting drum in combination with the return drum defines a throat therebetween for receiving the sorrel buds to be harvested. A drive simultaneously rotates the return drum and the cutting drum.

In another aspect, the machine further includes a conveyor mounted to the frame above the return drum and the cutting drum and is oriented to deliver a plurality of sorrel buds to the throat.

In still another aspect, the machine further includes a hopper mounted to the frame above the throat for receiving a plurality of sorrel buds and also includes a chute below the hopper oriented to deliver the plurality of sorrel buds to the throat.

In yet another aspect, the return drum further includes a circumferential lip at each end of the return drum wherein the circumferential lip extends radially outward from the smooth surface.

In a still further aspect, the cutting drum is adjustable with respect to the return drum to regulate the size of throat.

In another aspect, each end of the cutting drum axle is rotatably journaled to an adjuster. Each adjuster is affixed to the frame wherein each adjuster includes a shaft affixed to the frame and defining a central bore therethrough. A threaded adjustment bar is received in the central bore and includes a bearing on one end thereof which is journaled to the cutting drum axle and at and opposite end thereof the threaded adjustment bar engages a flange affixed to the frame. At least one not is engaged on the threaded adjustment bar and bears against flange and is rotatable thereagainst for translating the cutting drum with respect to the return drum.

In another aspect, the drive includes a drive pulley and a belt engaged thereon wherein the belt further engages a return drum pulley for rotating the return drum and also engages a cutting drum pulley for rotating the cutting drum.

In a still further aspect, the return drum pulley has a diameter greater than the diameter of the cutting drum pulley for rotating the cutting drum pulley at a faster rate than the return drum pulley.

In yet another aspect, the machine further includes a catchment tray positioned below the throat and angled to direct the calyces and seeds from the throat away from the machine.

In another aspect, the catchment tray has a plurality of perforations in a bottom thereof.

In still another aspect, the machine further includes an articulately configured blade tray affixed below the throat and the cutting drum for receiving sorrel buds exiting the throat. The blade tray comprises a plurality of spaced apart blades extending across the frame.

In yet another aspect, the blade trade blades are substantially radially aligned to the cutting drum axle.

In another aspect, a sorrel harvesting machine for removing the calyces from the seed of a sorrel bud includes a frame and a return drum rotatably mounted to the frame wherein the return drum has a substantially smooth face and a circumferential lip at each end of the return drum extending radially outward from the smooth surface. A cutting drum is rotatable about a cutting drum axle and is mounted to the frame in a tandem relationship with the return drum and is adjustable with respect thereto. The cutting drum has a plurality of circumferential blades oriented perpendicular to the cutting drum axle and are substantially equally spaced one from another. The cutting drum in combination with the return drum defines a throat therebetween for receiving sorrel buds. An arcuately configured blade tray is affixed below the throat and the cutting drum for receiving sorrel buds exiting the throat wherein the blade tray comprises a plurality of spaced apart blades extending across the frame. A drive simultaneously rotates the return drum and the cutting drum.

In still another aspect, the drive includes a drive pulley and a belt engaged thereon wherein the belt further engages a return drum pulley for rotating the return drum and also engages a cutting drum pulley for rotating the cutting drum.

In yet another aspect, the return drum pulley has a diameter greater than the diameter of the cutting drum pulley for rotating the cutting drum pulley at a faster rate than the return drum pulley.

In a still further aspect, each end of the cutting drum axle is rotatably journaled to an adjuster. Each adjuster is affixed to the frame wherein each adjuster includes a shaft affixed to the frame and defining a central bore therethrough. A threaded adjustment bar is received in the central bore and includes a bearing on one end thereof which is journaled to the cutting drum axle and at and opposite end thereof the threaded adjustment bar engages a flange affixed to the frame. At least one not is engaged on the threaded adjustment bar and bears against flange and is rotatable thereagainst for translating the cutting drum with respect to the return drum.

In another aspect, the blade tray blades are substantially radially aligned to the cutting drum axle.

In another aspect, the machine includes a catchment tray positioned below the throat and angled to direct calyces and seeds from the throat away from the machine.

In a still further aspect, the catchment tray has a plurality of perforations in the bottom thereof.

In yet another aspect, a method for removing the calyces from the seed of a sorrel bud includes obtaining a sorrel harvesting machine having a smooth surfaced return drum rotatably mounted to a frame. A cutting drum is rotatable about a cutting drum axle and is mounted to the frame in a tandem relationship with the return drum and defines a throat therebetween wherein the cutting drum includes a plurality of circumferential blades oriented perpendicular to the axle and substantially equally spaced one from another. The cutting drum is adjustable with respect to the return drum to regulate size of the throat. A drive simultaneously rotates the return drum and the cutting drum. The drive is engaged to simultaneously rotate the return drum and the cutting drum. A plurality of sorrel buds is introduced to the throat of the harvesting machine. The return drum is allowed to rotate the plurality of sorrel buds against the rotating blades of the cutting drum. The cutting drum blades cause the calyces of the sorrel bud to be cut from the seed and to exit the throat.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In one exemplary implementation of the invention, a sorrel harvesting machine 100 is shown in FIGS. 1-4 illustrating its various components where a supporting frame 110 supports a return drum 140 on a central return drum axle 142 thereof and a cutting drum 150 on a central cutting drum axle thereof, the central return and cutting drum axles being disposed in a spaced tandem fashion wherein the return drum 140 and the cutting drum 150 are disposed proximate one to the other and spaced apart from one another so as to define therebetween a desired opening of a throat 102. A conveyor 130 is mounted to the frame 110 above the return drum 140 and includes a conveyor belt 132 for feeding sorrel buds into the throat 102 in a timely and regulated manner.

Figure 1:
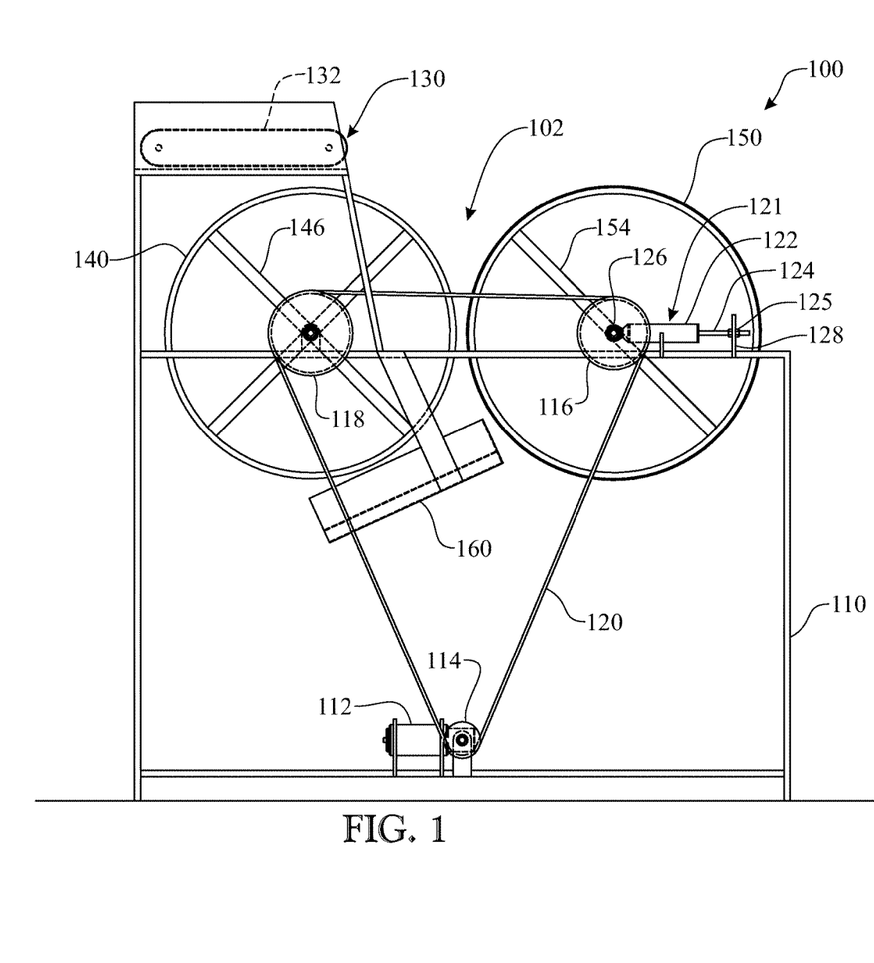
FIG. 1 presents a side elevation view of a sorrel harvesting machine according to the present invention.
Figure 2:
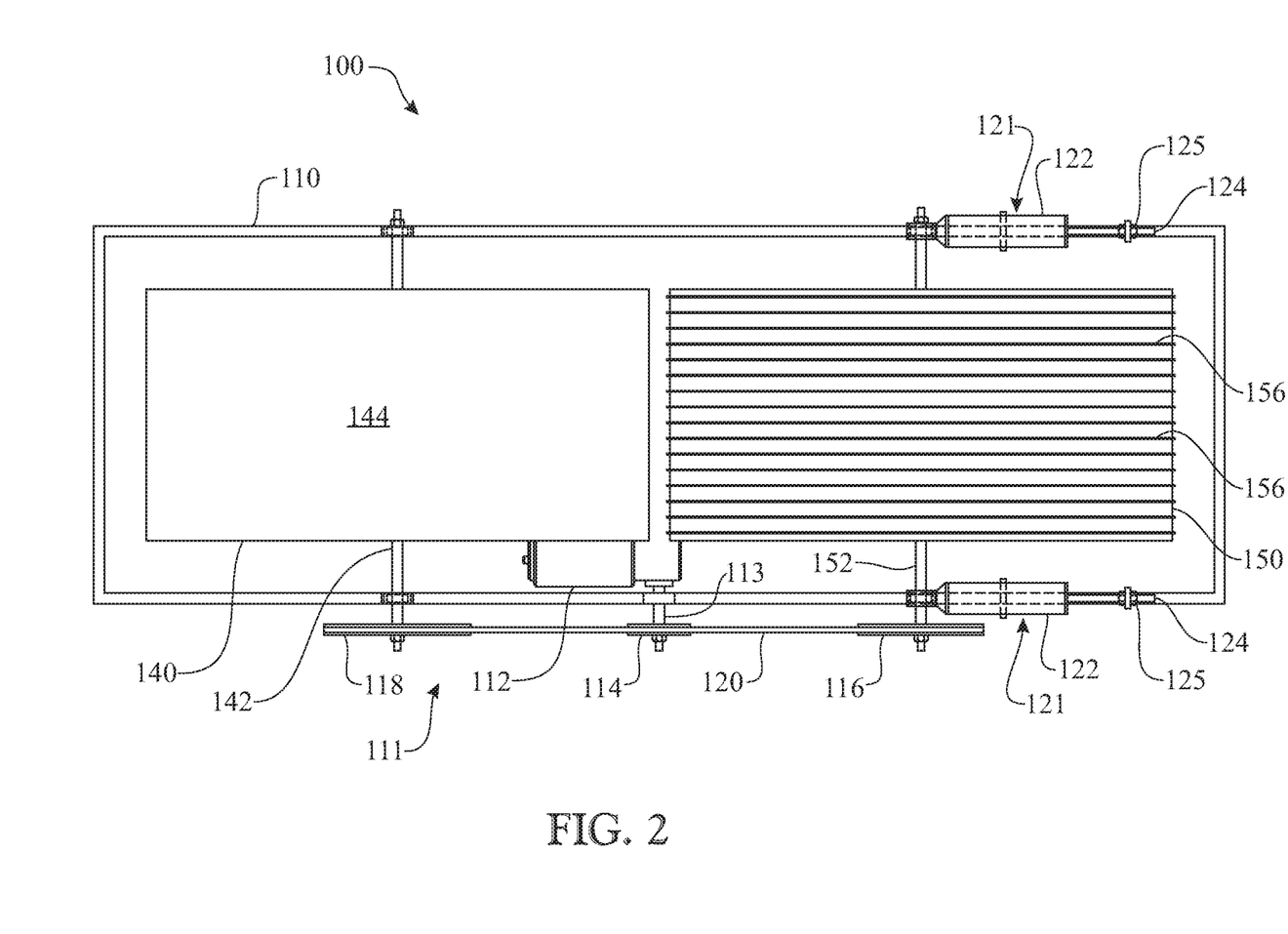
FIG. 2 presents a top plan view of the sorrel harvesting machine with the conveyor removed therefrom.
Figure 3:
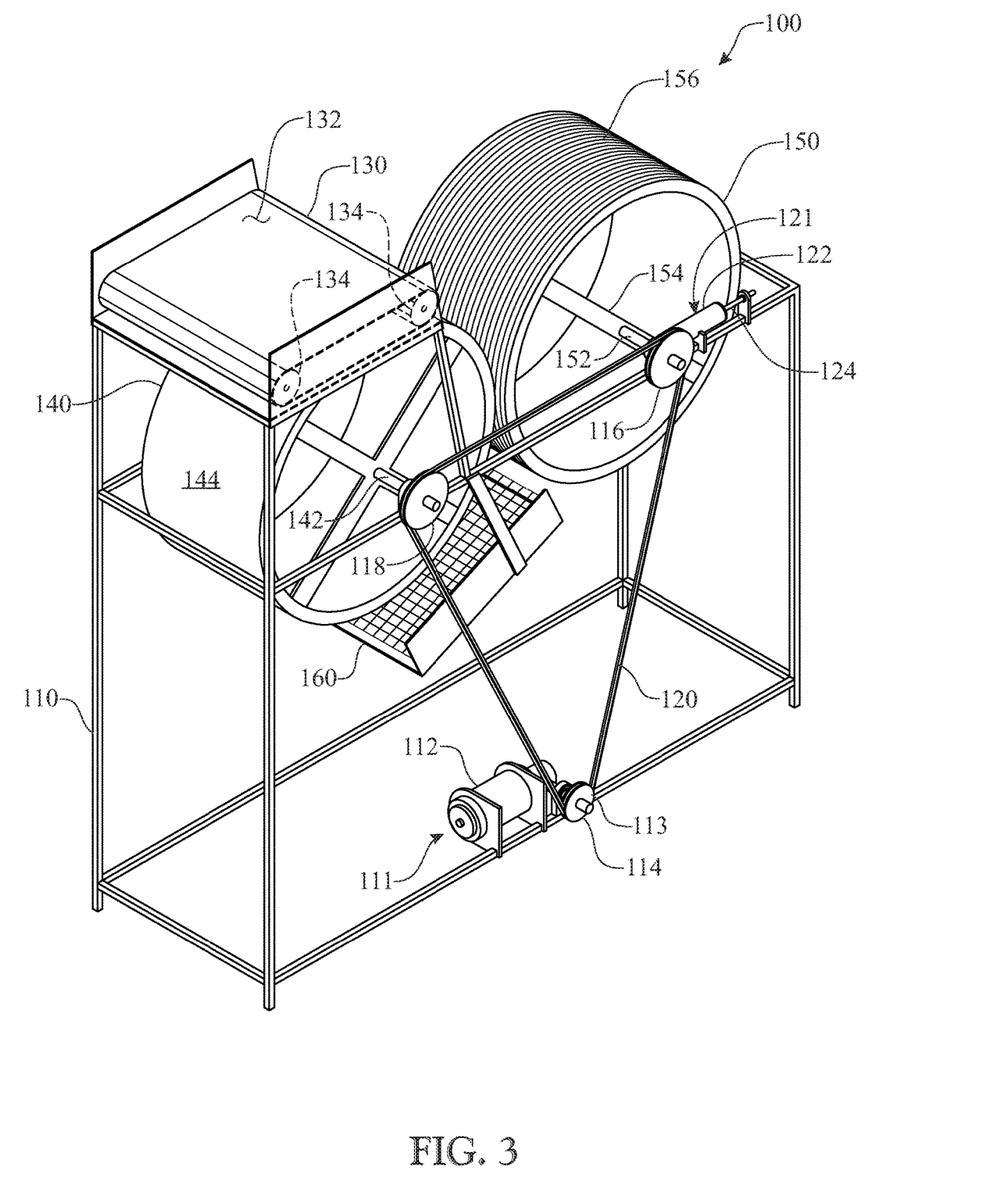
FIG. 3 presents a top isometric view of the sorrel harvesting machine.

The central return drum axle 142 of the return drum 140 is affixed at the center of a diametrical stabilizing bar 146 on each side of the return drum 140. The return drum axle 142 is rotatably journaled to a bearing mounted on the frame 110 thereby permitting the return drum 40 to freely rotate about a central axis. The return drum 140 has a smooth surface 144 at a periphery of the return drum 140. In the most preferred arrangement, the return drum 140 has a diameter of approximately 20.0 inches and a width of approximately 12.0 inches.

The central cutting drum axle 152 of the cutting drum 150 is affixed at the center of a diametrical stabilizing bar 154 on each side of the cutting drum 150. An adjuster 121 is mounted to the frame 110 adjacent and spaced outwardly from each side of the cutting drum 150. The adjuster 121 having a shaft 122 with a central bore is fixedly mounted to the frame 110. The shaft 122 receives in the central bore a threaded adjustment bar 124 which is longitudinally translatable therein. The threaded adjustment bar 124 has at one end a bearing 126 in which the cutting drum axle 152 is rotatably journaled. An opposite end of the threaded adjustment bar 124 engages a flange 128 on the frame 110 and includes one or more nuts 125 threaded thereon to bear against the flange 128. Operation of the adjuster 121 by selective threading of nuts 125 translates the cutting drum 150 closer to or farther away from the return drum 140 thereby regulating the size of the opening of the throat 102.

Figure 4:
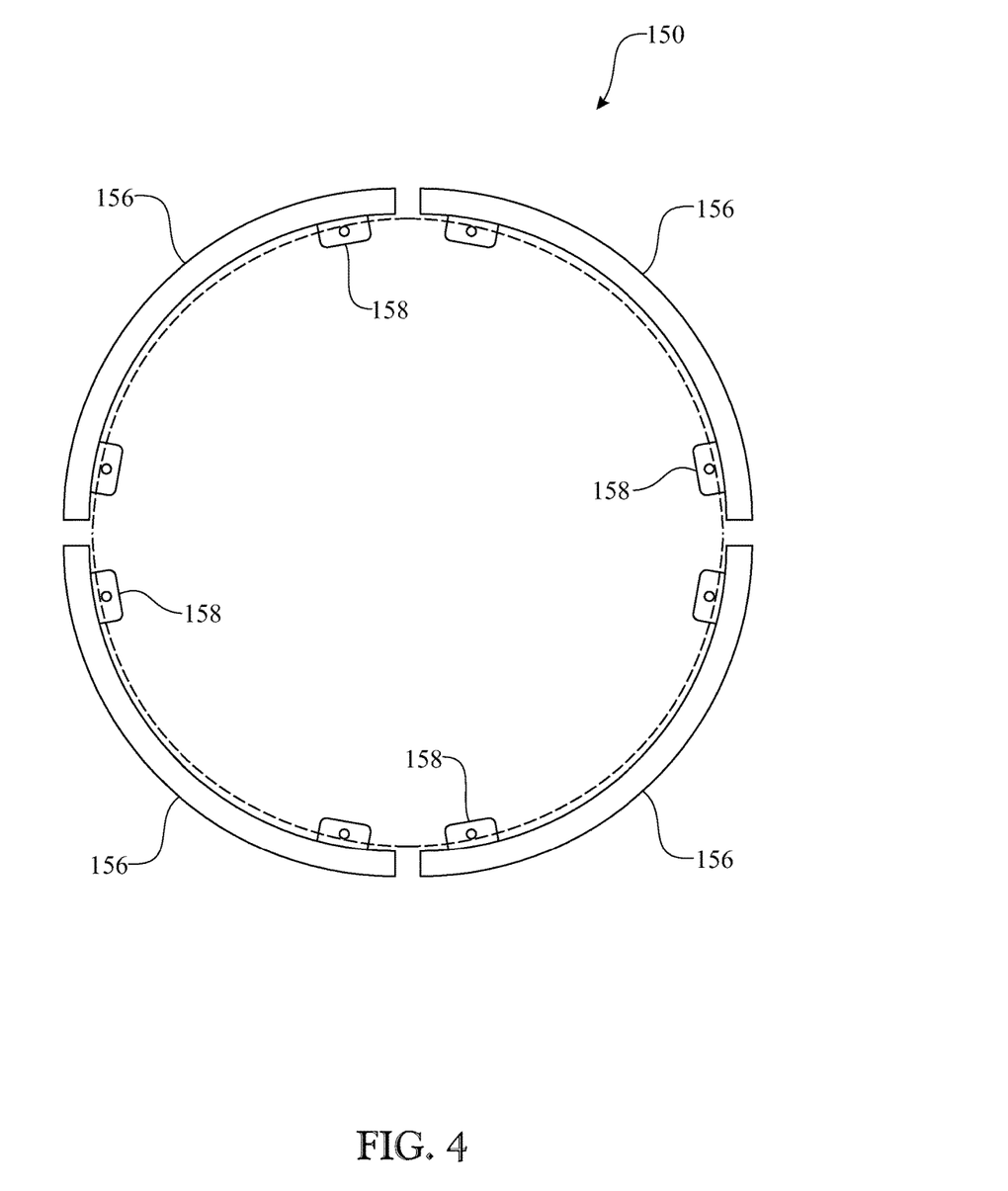
FIG. 4 presents a side elevation view of the cutting blades for attachment to the cutting drum.
Figure 5:
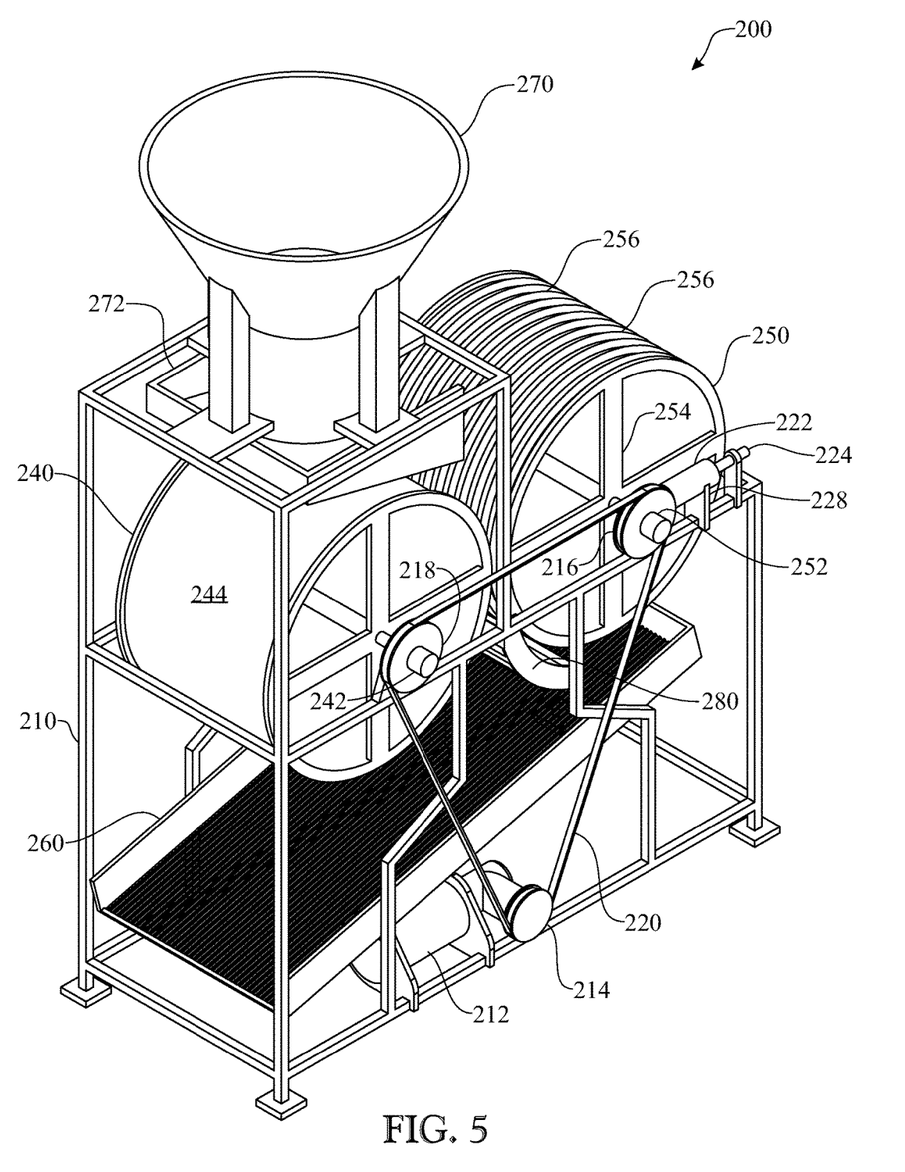
FIG. 5 presents a top rear isometric view of an alternate embodiment sorrel harvesting machine.
Figure 6:
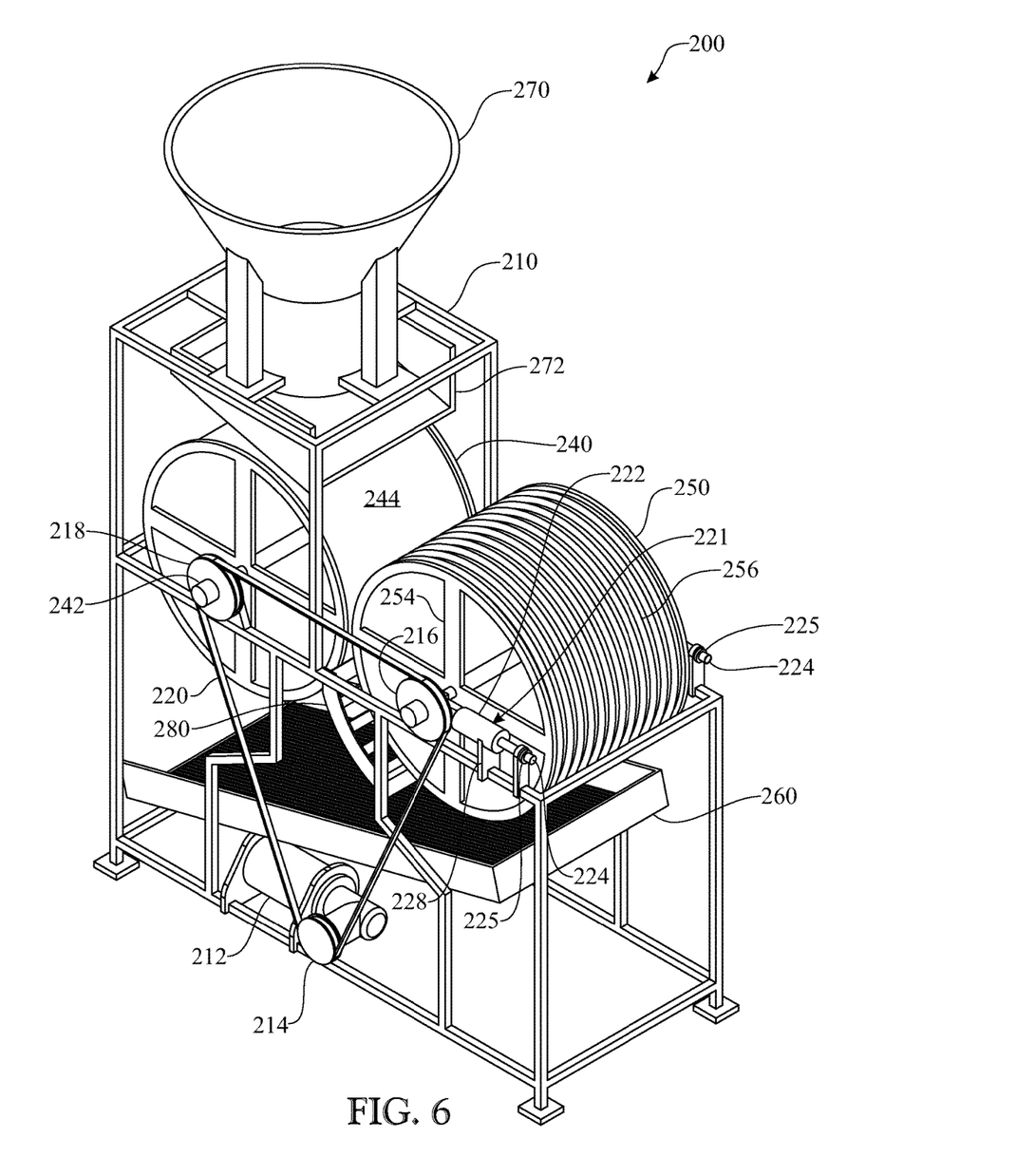
FIG. 6 presents a top front isometric view of the alternate embodiment sorrel harvesting machine of FIG. 5.

The cutting drum 150 includes a plurality of blades 156 affixed thereto about a periphery of the drum 150 and substantially perpendicular to the cutting drum axle 152. Each blade 156 includes tabs 158 which fit into slots (not shown) on the surface of the cutting drum 150 to facilitate attachment of the blades 156 to the cutting drum 150 (FIG. 4). In the most preferred arrangement, each blade 156 constitutes one fourth of the circumference of the drum 150 and the diameter of the blades 156 when affixed to the cutting drum 150 is approximately 20.0 inches. The blades 156 are arranged in sixteen circular sets equally spaced (approximately ½ inch) over an approximately 12 inch width of the cutting drum 150.

Aft drive mechanism 111 is mounted on the supporting frame 110 adjacent to and outwardly spaced from one side of the return drum 140 and the cutting drum 150 and being rotatably drivingly interengaged with the central return drum axle 142 of the return drum 140 and the central cutting drum axle 152 of the cutting drum 150. More particularly, the drive mechanism 111 includes an electric motor 112 mounted to the supporting frame 110 and having a rotatable drive member, for example, in the form of a drive pulley 114 mounted to and rotated by an output shaft 113 of the electric motor. The drive pulley 114 is disposed in line with one of a pair of opposite ends of each of the central return drum axle 142 and the central cutting drum axle 152. The drive mechanism 111 also includes a first rotatably driven member, for example, in the form of a cutting drum pulley 116, a second rotatably driven member, for example, in the form of a return drum pulley 118, and a motion transmitting member, for example, in the form of a V-belt 120 entrained about and drivingly interconnecting the drive pulley 114, the cutting drum pulley 116, and the return drum pulley 118. The return drum pulley 118 is mounted on the one end of the central return drum axle 142 and in line with the drive pulley 114. The cutting drum pulley 116 is mounted on the one end of the central cutting drum axle 152 in line with the return drum pulley 118 and the drive pulley 114. The V-belt 120 is disposed in a triangular configuration so as to engage and extend about respective outside arcuate portions of the drive pulley 114, the cutting drum pulley 116, and the return drum pulley 118 facing in directions away from one another such that when electric motor 112 is energized, the drive pulley 114 engages the V-belt 120 which, in turn, drives the cutting drum pulley 116 and the return drum pulley 118 so as to cause the return drum 140 and the cutting drum 150 to rotate in the same angular clockwise directions on their respective axles 142, 152 such that respective portions of their peripheries located at the opening of the throat 102 move in opposite directions at the throat 102 with respect to one another. Further, the diameter of the return drum pulley 118 is larger than the diameter of the cutting drum pulley 116. In this manner, the cutting drum 150 rotates at a faster rate than the return drum 140.

In the most preferred arrangement, the cutting drum pulley 116 has a diameter of 4.5 inches and the return drum pulley 118 has a diameter of 5.0 inches. The drive pulley 114 has a diameter of 2.0 inches and the electric motor 112 operates at 1500 RPM.

A catchment tray 160 is fixedly mounted to frame 110 below the return drum 140 and the throat 102 and angled downwardly therefrom for directing the separated seed and cut calyces to exit the machine 100.

In use, a plurality of gathered sorrel buds are sorted according to size. The cutting drum 150 is then positioned with respect to the return drum 140 by positioning the nuts 125 on the threaded adjustment bar 124 to effect a desired opening of the throat 102. The sorrel buds are then introduced to the conveyor belt 132 which, in turn, feeds the sorrel buds into the throat 102 defined by the adjacent return drum 140 and cutting drum 150. The drive 112 rotates the return drum 140 and the cutting drum 150 in the same angular direction (i.e. both drums 140, 150 rotating clockwise) thereby causing drum surfaces at the throat 102 to be moving in opposite directions. The combination of the opposite directional movement of the drum surfaces at the throat 102 and the difference in rotational rates of the drums 140, 150 results in the rotation of the sorrel buds in the throat 102 against the blades 156 of the cutting drum 150 and thereby facilitates the cutting of the calyces by the blades 156 of the cutting drum 150 and thereby effecting efficient removal of the calyces from the seed at the throat 102. The separated seeds and calyces exit the throat 102 and are collected on the catchment tray 160. The downward angle of the catchment tray 160 directs the separated sorrel seed and cut calyces to exit the machine 100.

In an alternate implementation of the invention, a sorrel harvesting machine 200 is shown in FIGS. 5-9 illustrating its various components where a supporting frame 210 supports a return drum 240 and a cutting drum 250 in a tandem fashion wherein the return drum 240 and the cutting drum 250 are proximate one to the other and define therebetween a throat 202. A hopper 270 is mounted to the frame 210 above the return drum 240 and includes a chute 272 at the bottom of the hopper 270 for feeding sorrel buds into the throat 202 in a timely and regulated manner.

The return drum 240 has a central return drum axle 242 affixed at the center of a diametrical stabilizing bar 246 on each side of the return drum 240. The return drum axle 242 is rotatably journaled to a bearing mounted on the frame 210 thereby permitting the return drum 240 to freely rotate about a central axis. The return drum 240 has a smooth surface 244, and in a most preferred arrangement, the return drum 240 has a diameter of approximately 20.0 inches and a width of approximately 12.0 inches.

The cutting drum 250 has a central cutting drum axle 252 affixed at the center of a diametrical stabilizing bar 254 on each side of the cutting drum 250. An adjuster 221 is mounted to the frame 210 on each side of the cutting drum 250. The adjuster 221 has a shaft 222 with a central bore fixedly mounted to the frame 210. The shaft 222 receives in the central bore a threaded adjustment bar 224 which is longitudinally translatable therein. The threaded adjustment bar 224 has at one end a bearing 226 in which the cutting drum axle 252 is journaled. An opposite end of the threaded adjustment bar 224 engages a flange 228 on the frame 210 and includes one or more nuts 225 threaded thereon to bear against the flange 228. Operation of the adjuster 221 by selective threading of the nuts 225 translates the cutting drum 250 closer to or farther away from the return drum 240 thereby regulating the size of the throat 202.

The cutting drum 250 includes a plurality of blades 256 affixed thereto about a periphery of the drum 250 and substantially perpendicular to the cutting drum axle 252. Each blade extends about the periphery of the cutting drum 250 wherein the plurality of blades 256 are substantially equally spaced along the width of the cutting drum 250.

Figure 7:
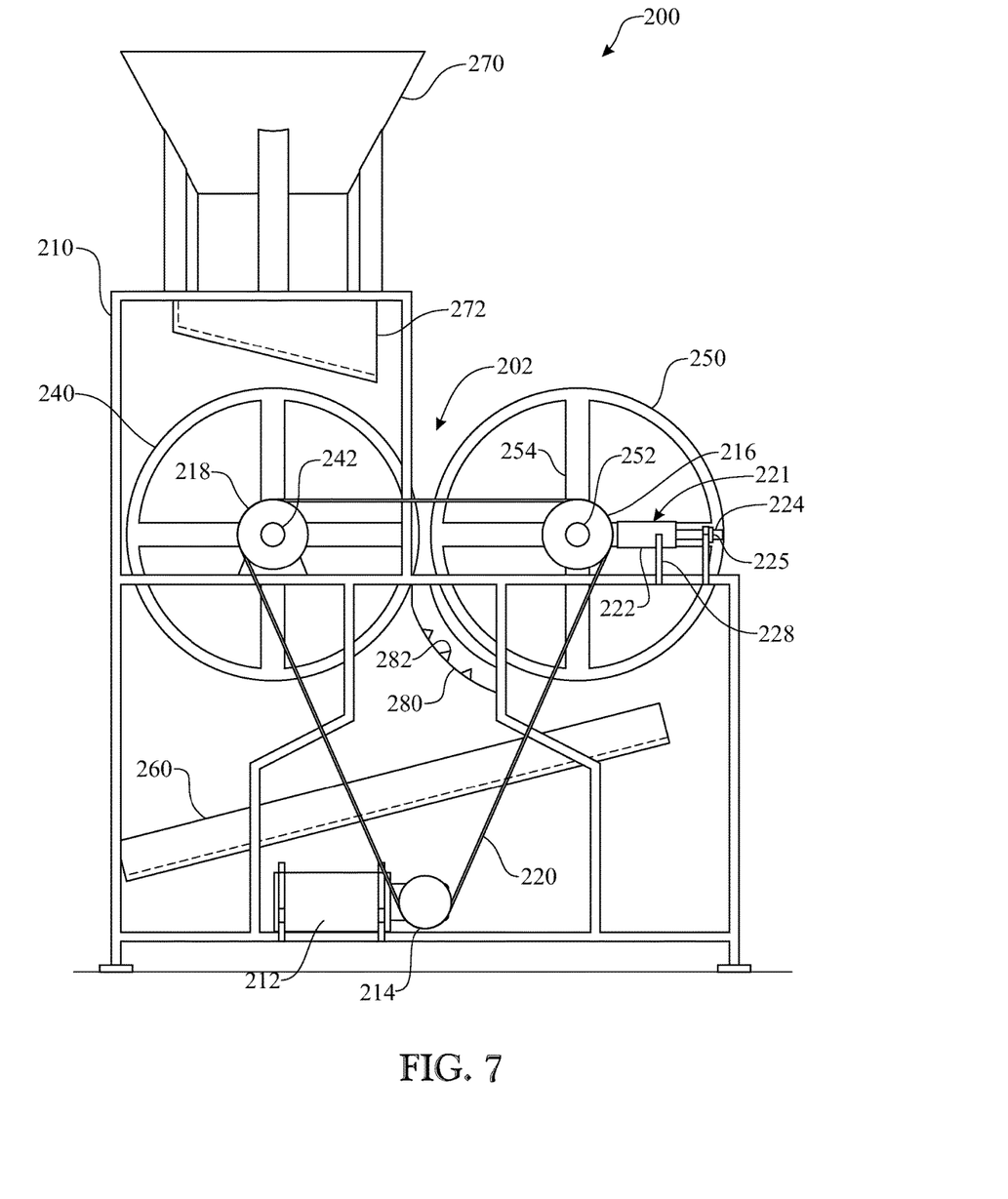
FIG. 7 presents a side elevation view of the alternate embodiment sorrel harvesting machine FIG. 5.
Figure 8:
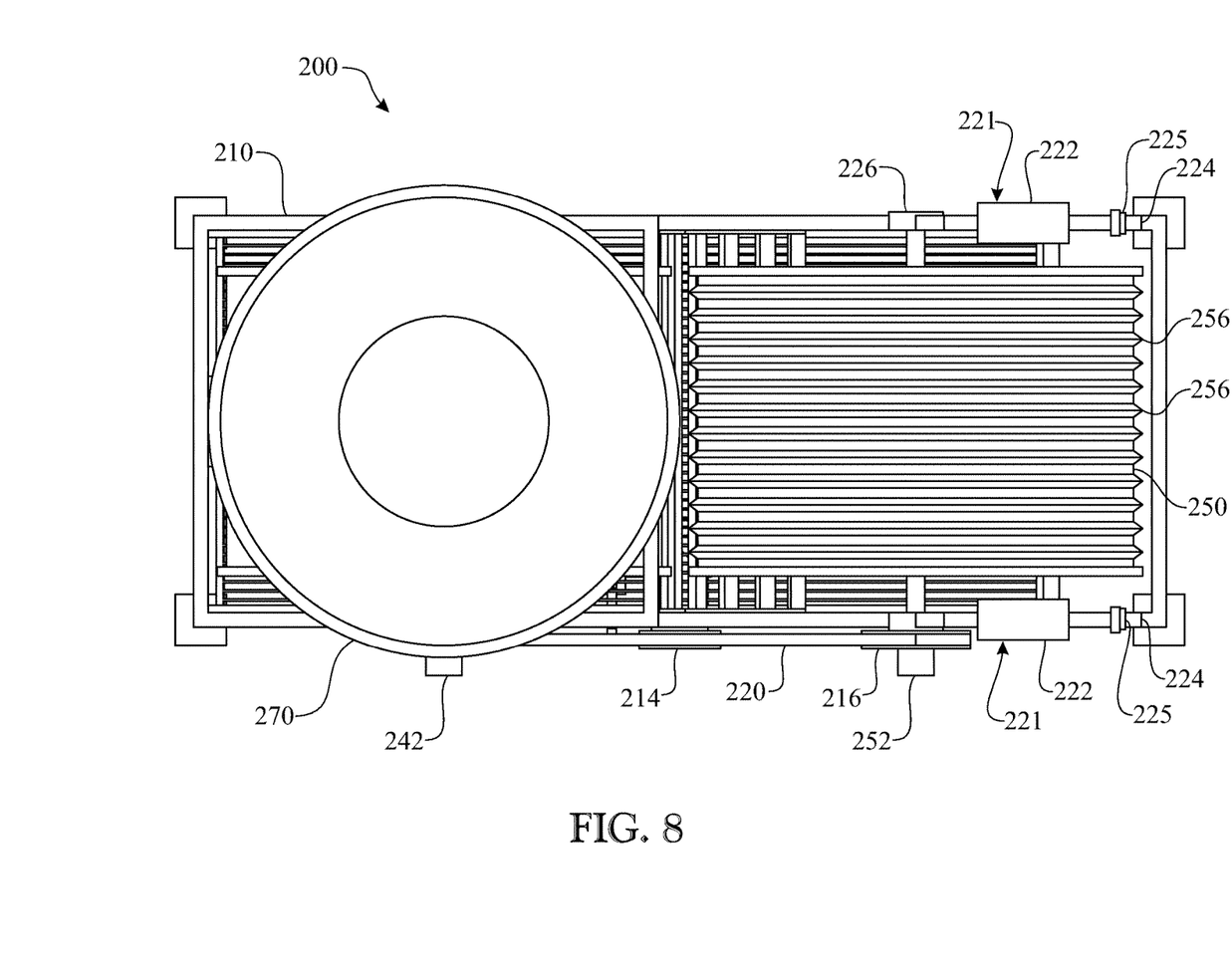
FIG. 8 presents a top plan view of the alternate embodiment sorrel harvesting machine FIG. 5.
Figure 9:
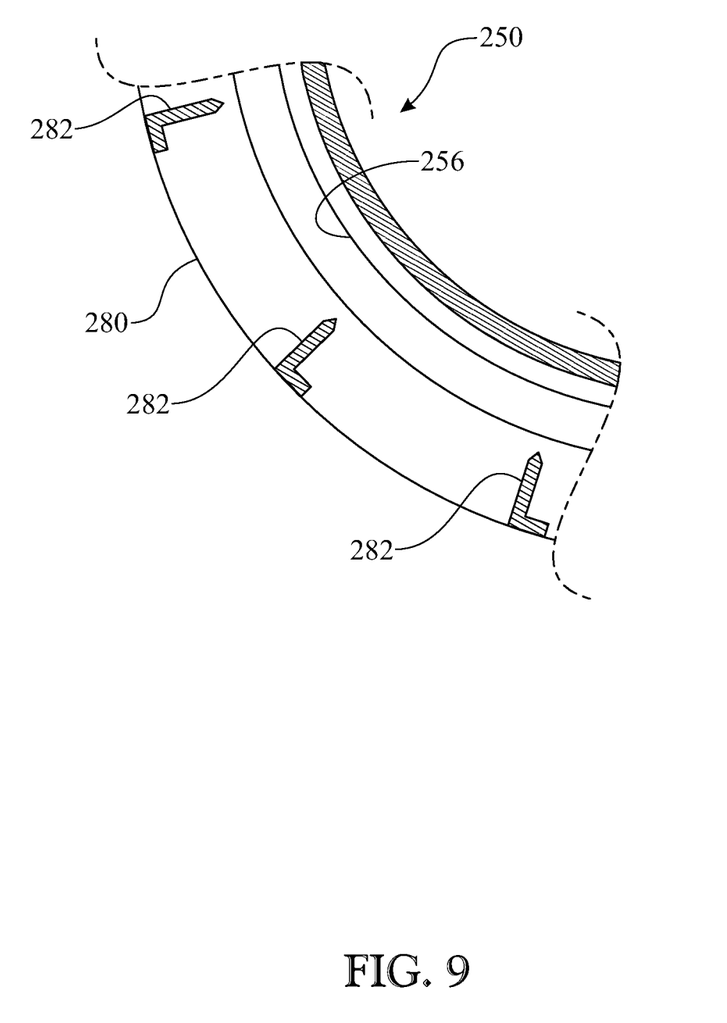
FIG. 9 presents a partial cross-sectional elevation view of the cutting drum and the blade tray.

As most easily seen in FIGS. 7 and 9, a blade tray 280 has an arcuate configuration substantially concentric to the cutting drum 250 and positioned below the throat 202 such that the sorrel buds exiting the throat 202 are captured by the blade tray 280. The blade tray 280 includes a plurality of blades 282 equally spaced one from another, extending the width of the frame 210. The blades 282 are arranged orthogonally to the blades 256 of the cutting drum 250 and radially aligned with said cutting drum axle 252.

An electric motor 212 is mounted to the supporting frame 210 and drives a drive pulley 214. A return drum pulley 218 is mounted on the return drum axle 242 and in line with the drive pulley 214. The cutting drum 250 has a cutting drum pulley 216 mounted on the central cutting drum axle 252 also in line with the return drum pulley 218 and the drive pulley 214. A V-belt 220 extends about the drive pulley 214, the cutting drum pulley 216, and the return drum pulley 218 such that when electric motor 212 is energized, the drive pulley 214 engages the V-belt 220 which, in turn, causes the return drum 240 and the cutting drum 250 to rotate in opposite directions at the throat 202. Further, the diameter of the return drum pulley 218 is larger than the diameter of the cutting drum pulley 216. In this manner, the cutting drum 250 rotates at a faster rate than the return drum 240.

In the most preferred arrangement, the cutting drum pulley 216 has a diameter of 4.5 inches and the return drum pulley 218 has a diameter of 5.0 inches. The drive pulley 214 has a diameter of 2.0 inches and the electric motor 212 typically operates in excess of 1000 RPM.

A catchment tray 260 is vibrationally mounted to frame 210 below the return drum 240 and the throat 202 and angled downwardly therefrom to direct the separated seed and cut calyces to exit the machine 200. Further, the bottom of the catchment tray to 60 is configured as a grate defining a plurality of perforations therethrough. The perforation size is such that, as the catchment tray 260 vibrates, the cut calyces pass through the perforations and the seeds are directed off an end of the catchment tray 260 thereby sorting the cut calyces from the seeds of the sorrel buds.

In use, a plurality of gathered sorrel buds are sorted according to size. The cutting drum 250 is then positioned with respect to the return drum 240 by positioning the nuts 225 on the threaded adjustment bar 224 to effect a desired opening of the throat 202. The sorrel buds are then introduced to the hopper 270 which, in turn, feeds the sorrel buds into the chute 272 and then the throat 202 defined by the adjacent return drum 240 and cutting drum 250. The drive 212 rotates the return drum 240 and the cutting drum 250 in the same angular direction (i.e. both drums 240, 250 rotating clockwise) thereby causing drum surfaces at the throat 202 to be moving in opposite directions. The combination of the opposite directional movement of the drum surfaces at the throat 202 and the difference in rotational rates of the drums 240, 250 results in the rotation of the sorrel buds in the throat 202 against the blades 256 of the cutting drum 250 and thereby facilitates the cutting of the calyces by the blades 256 on the cutting drum 250. The lips 248 on either end of the return drum 240 in combination with the outer blades 256 of the cutting drum 250 prevent any of the sorrel buds from being ejected to the side of the machine 200 prior to being processed through the throat 202. After exiting the throat 202, the calyces of the sorrel buds are cut down to the seed and exit the throat 202 to the blade tray 280. The blades 282 of the blade tray 280 being transversely fixed with respect to the rotating blades 256 of the cutting drum 250 and radially aligned with said cutting drum axle 252 operate to efficiently remove the remaining calyces from the seed. The separated calyces and seeds pass through the spaced apart blades 282 of the blade tray 280 and are collected on the catchment tray 260. The downward angle of the catchment tray 260 directs the separated sorrel seed and cut calyces to exit the machine 200. The catchment tray 260 can have a bottom configured as a grate defining a plurality of perforations therethrough such that as the catchment tray 260 vibrates, the calyces fall through the grate and the seeds are directed down the incline of the catchment tray 260 so that the seeds and the calyces are automatically sorted one from the other.

The present invention has advantages which include, without limitation, major savings and labor costs and a substantial reduction in time required to separate the calyces from the seed of the sorrel buds. Utilization of the sorrel harvesting machine offers a yield of approximately 50 kg in one hour. This improvement enables farmers to more cost-effectively harvest the sorrel buds and in turn become highly competitive in the sorrel harvesting global market by saving significant labor costs and time during the process. An additional advantage is a substantially higher amount in the yield per acre which further equips the farmer to be more competitive.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What we claim is:

1. A sorrel harvesting machine for removing the calyces from the seed of a sorrel bud, said machine comprising:
   a frame;
   a return drum having a central return drum axle rotatably mounted to said frame, said return drum having a substantially smooth surface about a periphery of said return drum;
   a cutting drum having a central cutting drum axle rotatably mounted to said frame in a spaced tandem relationship with said central return drum axle, said cutting drum having a plurality of circumferential blades about a periphery of said cutting drum being oriented perpendicular to said central cutting drum axle and substantially equally spaced one from another, said cutting drum and said return drum being disposed in a spaced tandem relationship with one another so as to define an opening of a throat therebetween for receiving sorrel buds;
   an arcuately configured blade tray affixed to said frame and disposed below said opening of said throat and said cutting drum for receiving sorrel buds exiting said opening of said throat, said blade tray comprising a plurality of spaced apart blades extending across said frame; and a drive mechanism supported by said frame adjacent to and outwardly spaced from one side of said return drum and said cutting drum and being rotatably drivingly interengaged with said return drum axle of said return drum and said cutting drum axle of said cutting drum so as to simultaneously rotate said return drum and said cutting drum in the same angular direction causing portions of said peripheries of said return drum and said cutting drum located at said opening of said throat to move in opposite directions relative to one another at said throat.

2. The machine according to claim 1 further comprising a conveyor mounted to said frame above said return drum and said cutting drum and oriented to deliver a plurality of sorrel buds to said opening of said throat.

3. The machine according to claim 1 further comprising a hopper mounted to said frame above said return drum for receiving a plurality of sorrel buds, and further including a chute disposed below said hopper and oriented to deliver the plurality of sorrel buds to said opening of said throat.

4. The machine according to claim 1 wherein said cutting drum axle has opposite ends; and also further comprising a pair of adjusters affixed to said frame and rotatably journaled to said respective opposite ends of said cutting drum axle, each of said adjusters being actuatable to move said cutting drum axle and thereby said cutting drum therewith relative to said return drum to regulate the size of said opening of said throat between said cutting and return drums.

5. The machine according to claim 4 wherein each said adjuster comprises:
a shaft affixed to said frame, said shaft defining a central bore therethrough;
a threaded adjustment bar received in said central bore, said threaded adjustment bar having a bearing on one end thereof, said bearing journaled to one of said opposite ends of said cutting drum axle, and said threaded adjustment bar at an opposite end thereof engaging a flange affixed to said frame; and
at least one nut engaged on said threaded adjustment bar bearing against said flange and rotatable thereagainst for translating said cutting drum with respect to said return drum.

6. The machine according to claim 1 wherein said drive mechanism comprises:
a motor mounted to said frame and having a rotatable drive member disposed in line with one of a pair of opposite ends of each of said central return and cutting drum axles;
a first rotatably driven member spaced from said rotatable drive member and being mounted on said one end of said central cutting drum axle and in line with said rotatable drive member;
a second rotatably driven member spaced from said rotatable drive member and said first rotatably driven member and being mounted on said one end of said central return drum axle and in line with said rotatable drive member and said first rotatably driven member; and
a motion transmitting member drivingly interconnecting said rotatable drive member with said first and second rotatably driven members at respective outside arcuate portions of said rotatable drive member and said first and second rotatably driven members that face in directions away from one another such that rotation of said rotatable drive member causes said first and second rotatably driven members and thereby said return drum and said cutting drum to simultaneously rotate in the same angular direction.

7. The machine according to claim 6 wherein said second rotatably driven member has a diameter greater than a diameter of said first rotatably driven member for rotating said cutting drum at a faster rate than said return drum.

8. The machine according to claim 1 further including a catchment tray positioned below said opening of said throat and angled to direct calyces and seeds from said throat away from said machine.

9. The machine according to claim 1 wherein said blade tray blades are substantially radially aligned to said cutting drum axle.

10. A sorrel harvesting machine for removing the calyces from the seed of a sorrel bud, said machine comprising:
a frame;
a return drum having a central return drum axle rotatably mounted to said frame, said return drum having a substantially smooth surface about a periphery of said return drum;
a cutting drum having a central cutting drum axle rotatably mounted to said frame in a spaced tandem relationship with said central return drum axle, said cutting drum having a plurality of circumferential blades about a periphery of said cutting drum being oriented perpendicular to said central cutting drum axle and substantially equally spaced one from another, said cutting drum and said return drum being disposed in a spaced tandem relationship with one another so as to define an opening of a throat therebetween for receiving sorrel buds;
an arcuately configured blade tray affixed to said frame and disposed below said opening of said throat and said cutting drum for receiving sorrel buds exiting said throat, said blade tray comprising a plurality of spaced apart blades extending across said frame;
a catchment tray affixed to said frame and positioned below said opening of said throat and angled to direct calyces and seeds from said throat to exit from said machine; and
a drive mechanism supported by said frame adjacent to and outwardly spaced from one side of said return drum and said cutting drum and being rotatably drivingly interengaged with said return drum axle of said return drum and said cutting drum axle of said cutting drum so as to simultaneously rotate said return drum and said cutting drum in the same angular direction causing portions of said peripheries of said return drum and said cutting drum located at said opening of said throat to move in opposite directions relative to one another at said throat.

11. The machine according to claim 10 wherein said drive mechanism comprises:
a motor mounted to said frame and having a rotatable drive pulley disposed in line with one of a pair of opposite ends of each of said central return and cutting drum axles;
a rotatably driven cutting drum pulley spaced from said rotatable drive pulley and being mounted on said one end of said central cutting drum axle and in line with said rotatable drive pulley;
a rotatably driven return drum pulley spaced from said rotatable drive pulley and said rotatably driven cutting drum pulley and being mounted on said one end of said central return drum axle and in line with said rotatable drive pulley and said rotatably driven cutting drum pulley; and a motion transmitting belt drivingly interconnecting said rotatable drive pulley with said rotatably driven cutting and return drum pulleys at respective outside arcuate portions of said rotatable drive member and said rotatably driven cutting and return drum pulleys that face in directions away from one another such that rotation of said rotatable drive pulley causes said rotatably driven cutting and return drum pulleys and thereby said return drum and said cutting drum to simultaneously rotate in the same angular direction.

12. The machine according to claim 11 wherein said rotatably driven return drum pulley has a diameter greater than a diameter of said rotatably driven cutting drum pulley for rotating said rotatably driven cutting drum pulley at a faster rate than said rotatably driven return drum pulley.

13. The machine according to claim 10 wherein said cutting drum axle has opposite ends; and also further comprising a pair of adjusters rotatably journaled to said respective opposite ends of said cutting drum axle, each of said adjusters being actuatable to move said cutting drum axle and thereby said cutting drum therewith relative to said return drum to regulate the size of said opening of said throat between said cutting and return drums, wherein each said adjuster comprises:

a shaft affixed to said frame, said shaft defining a central bore therethrough;

a threaded adjustment bar received in said central bore, said threaded adjustment bar having a bearing on one end thereof, said bearing journaled to said cutting drum axle, and said threaded adjustment bar at an opposite end thereof engaging a flange affixed to said frame; and at least one nut engaged on said threaded adjustment bar bearing against said flange and rotatable thereagainst for translating said cutting drum with respect to said return drum.

14. The machine according to claim 10 wherein said blade tray blades are substantially radially aligned to said cutting drum axle.

15. A method for removing the calyces from the seed of a sorrel bud, said method comprising the steps of:

obtaining a sorrel harvesting machine having a frame, a return drum with a central return drum axle rotatably mounted to the frame and a substantially smooth surface at a periphery of the return drum, a cutting drum with a central cutting drum axle rotatably mounted to the frame in a spaced tandem relationship with the central return drum axle such that the return and cutting drums are disposed in a spaced tandem relationship with one another so as to define an opening of a throat therebetween for receiving sorrel buds wherein the cutting drum includes a plurality of circumferential blades about a periphery of the cutting drum being oriented perpendicular to the central cutting drum axle and substantially equally spaced one from another, wherein the sorrel harvesting machine has an arcuately configured blade tray affixed to said frame and disposed below said opening of said throat and said cutting drum for receiving sorrel buds exiting said opening of said throat, said blade tray comprising a plurality of spaced apart blades extending across said frame, and further wherein the sorrel harvesting machine has a drive mechanism supported adjacent to and outwardly spaced from one side of the return and cutting drums and being rotatably drivingly interengaged with the return drum axle of the return drum and the cutting drum axle of the cutting drum so as to simultaneously rotate the return drum and cutting drum in the same angular direction causing portions of the peripheries of the return drum and the cutting drum located at the opening of the throat to move in opposite directions relative to one another at the throat;

engaging the drive mechanism to simultaneously rotate the return drum and the cutting drum in the same angular direction causing the portions of the peripheries of the return drum and the cutting drum located at the opening of the throat to move in opposite directions relative to one another at the throat;

introducing a plurality of sorrel buds to the opening of the throat of the harvesting machine;

allowing the return drum to rotate the plurality of sorrel buds against the rotating blades of the cutting drum; and causing the cutting drum blades to cut the calyces from the sorrel bud seed and to exit the throat.

* * * * *

UNITED STATES PATENT AND TRADEMARK OFFICE
CERTIFICATE OF CORRECTION

PATENT NO. : 9,629,390 B1
APPLICATION NO. : 14/163804
DATED : April 25, 2017
INVENTOR(S) : Oral Oneal Turner and Allison Deborah Turner Page 1 of 1

It is certified that error appears in the above-identified patent and that said Letters Patent is hereby corrected as shown below:

In the Specification

Column 5, Line 36 reads: "Aft drive mechanism 111"
and should read: "A drive mechanism 111"

Signed and Sealed this
Thirtieth Day of May, 2017

Michelle K. Lee
*Director of the United States Patent and Trademark Office*